United States Patent
Hashemi Toroghi et al.

(10) Patent No.: US 12,047,170 B2
(45) Date of Patent: Jul. 23, 2024

(54) SYSTEMS AND METHODS FOR EXECUTING FORWARD ERROR CORRECTION DECODING USING A GUESSING RANDOM ADDITIVE NOISE DECODING ALGORITHM

(71) Applicant: HUAWEI TECHNOLOGIES CO., LTD., Guangdong (CN)

(72) Inventors: Yoones Hashemi Toroghi, Stittsville (CA); Bashirreza Karimi, Ottawa (CA); Hamid Ebrahimzad, Ottawa (CA); Ali Farsiabi, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/067,259

(22) Filed: Dec. 16, 2022

(65) Prior Publication Data

US 2024/0204913 A1   Jun. 20, 2024

(51) Int. Cl.
*H04L 1/00* (2006.01)
*H03M 13/00* (2006.01)
*H03M 13/27* (2006.01)

(52) U.S. Cl.
CPC .......... *H04L 1/0052* (2013.01); *H04L 1/0071* (2013.01)

(58) Field of Classification Search
CPC .... H04L 1/0052; H04L 1/0071; H03M 13/27; H03M 13/3715; H03M 13/17; H03M 13/451; H03M 13/3723; H03M 13/1111; H03M 13/3746
See application file for complete search history.

(56) References Cited

U.S. PATENT DOCUMENTS 11,381,260 B2 * 7/2022 Gross ............... H03M 13/455
11,652,498 B2 * 5/2023 Duffy ............... H03M 13/3746
714/752

FOREIGN PATENT DOCUMENTS

WO    WO-2023068973 A1 *  4/2023

OTHER PUBLICATIONS

Duffy et al., "Capacity-Achieving Guessing Random Additive Noise Decoding", IEEE Transactions on Information Theory, vol. 65, No. 7, Jul. 2019, pp. 4023-4040.
(Continued)

*Primary Examiner* — Justin R Knapp
(74) *Attorney, Agent, or Firm* — BCF LLP

(57) ABSTRACT

Forward Error Correction decoding is executed by acquiring a stream of real data symbols from a communication medium, the stream of real data symbols being arranged in a real matrix. Virtual data symbols are generated and arranged in a virtual matrix by applying an interleaver map onto the real matrix. Codewords formed by a main matrix formed by the real matrix and the virtual matrix are iteratively decoded, an iteration of the decoding comprising identifying a set of consecutive received rows of the main matrix, accessing a set of pre-determined reference codewords and in response to determining that a given codeword of the set of consecutive received rows does not match any pre-determined reference codewords, executing a GRAND algorithm on the given codeword, the GRAND algorithm generating a substitute codeword for the given codeword. A system comprising a processor and a memory executes the Forward Error Correction decoding.

16 Claims, 6 Drawing Sheets

(56) References Cited

OTHER PUBLICATIONS

Duffy et al., "Ordered Reliability Bits Guessing Random Additive Noise Decoding", EEE Transactions on Signal Processing, vol. 70, 2022, pp. 4528-4542.
Duffy et al., "Quantized Guessing Random Additive Noise Decoding", submitted Apr. 19, 2022.
Sukmadji et al., "Zipper Codes: Spatially-Coupled Product-Like Codes With Iterative Algebraic Decoding", 2019, 16th Canadian Workshop on Information Theory (CWIT), pp. 1-6.
Smith et al., "Staircase Codes: FEC for 100 Gb/s OTN", Journal of Lightwave Technology, vol. 30, No. 1, Jan. 1, 2012, pp. 110-117.
Karimi et al., "Low-Latency Low-Overhead Zipper Codes", accepted to be published in ECOC, 2022, pp. 1-4.
Feltstrom et al., "Braided Block Codes", IEEE Transactions on Information Theory, vol. 55, No. 6, Jun. 2009, pp. 2640-2658.
OpenROADM MSA 5.0 W-Port Digital Specification, www.OpenROADM.org, Jun. 25, 2019, pp. 1-56.

\* cited by examiner

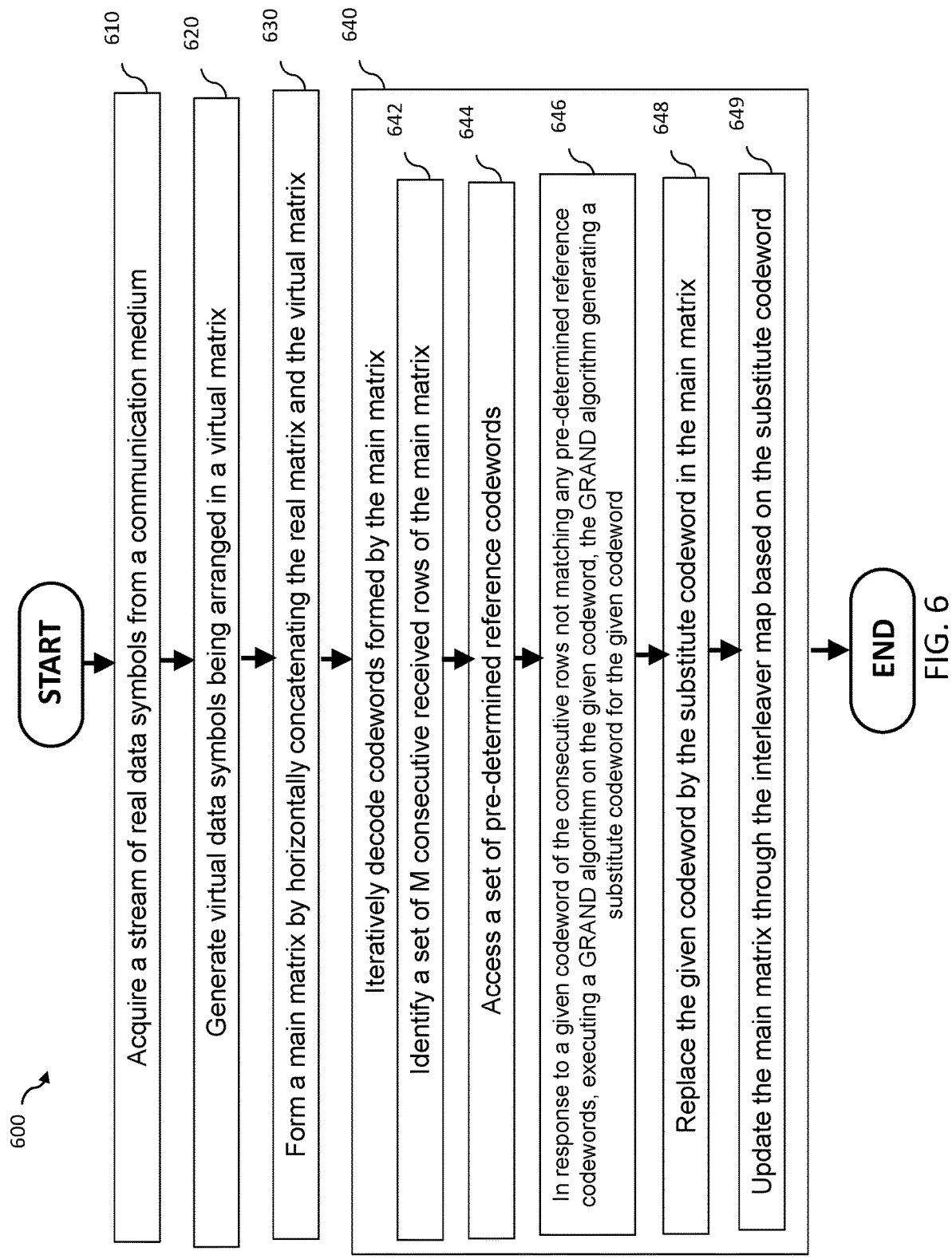

SYSTEMS AND METHODS FOR EXECUTING FORWARD ERROR CORRECTION DECODING USING A GUESSING RANDOM ADDITIVE NOISE DECODING ALGORITHM

TECHNICAL FIELD

The present disclosure relates to data encoding and decoding, and in particular to systems and methods for executing a Forward Error Correction (FEC) coding and decoding.

BACKGROUND

High-speed optical transceivers become increasingly commercially available. Forward Error Correction (FEC) are often used in combination with these optical communication systems enabling communication at a high-rate. Broadly speaking, FEC is a method of obtaining error control in data transmission in which the source (transmitter) sends redundant data and the destination (receiver) recognizes the portion of the data that contains no apparent errors. Because FEC does not require handshaking between the source and the destination, it can be used for broadcasting of data to many destinations simultaneously from a single source. Due to complexity constraints at high data throughputs, FEC schemes with hard-decision decoding may be preferred.

Spatially-coupled product-like hard-decision FEC schemes such as "staircase" and "zipper" codes have received considerable attention in fiber-optic communications due to their good performance operating close to the BSC channel capacity. For example, staircase codes can be implemented similarly to what is described an article entitled "*Staircase codes: FEC for* 100 *Gb/s OTN*", authored by B. P. Smith et al., published in the Journal of Lightwave Technology, vol. 30, no. 1, pp. 110-117, 2012, and the contents of which is incorporated herein by reference in its entirety. In another example, zipper codes can be implemented similarly to what is described an article entitled "*Zipper codes: Spatially-coupled product-like codes with iterative algebraic decoding*", authored by Y. Sukmadji, U. Martínez-Peñas, and F. R. Kschischang, published in 16th Canadian Workshop on Information Theory (CWIT), June 2019, pp. 1-6, and the contents of which is incorporated herein by reference in its entirety.

Guessing Random Additive Noise Decoding (GRAND) is a universal decoding algorithm that has recently gained traction as a practical way to perform maximum likelihood (ML) decoding in linear short-length and high-rate block channel codes in hard decision demodulation systems. GRAND algorithm generates a sequence of possible error patterns and applies them to a codeword and check if the results are valid codewords (i.e. whether an output of the application of a given error pattern on the codeword matches one valid pre-defined codeword). Ordered reliability bits GRAND (ORB GRAND) is a soft-input variant that efficiently utilize soft information (channel observation values), resulting in improved decoding performance over hard-input GRAND. Quantize GRAND is an alternative algorithm for efficient, practical soft-detection error correction decoding with GRAND that is an approximation to ML and does not require received bits to be rank-ordered by their reliability.

GRAND decoder's advantages have been demonstrated to be efficient when applied to short-length high-rate codes. However, in optical communication applications, relatively moderate-rate large-length codes are usually used. This makes GRAND decoding impractical in optical networks.

The Zipper framework is a newly proposed framework for describing spatially-coupled product-like codes such as staircase codes, braided block codes and Open FEC (OFEC). Conventionally, zipper codes are built with algebraic Bose-Chaudhuri-Hocquenghem (BCH) component codes and are decoded by decoding each component code iteratively. Bounded distance decoding and chase decoding are typically used for hard and soft decision decoding of BCH code in zipper structure, respectively. Typically, the best performance of staircase codes and zipper codes is achieved when ultra-low overheads (e.g., 1.5-2.5%) are being utilized. However, at ultra-low overheads, the required decoding memory is comparatively large, resulting in unacceptable latency.

A low-latency solution for designing decoding protocols for moderate-rate large-length codes is thus desirable.

SUMMARY

An aspect of the present technology is thus to provide a new low-latency solution for the problem of designing universal decoding in practical product-like codes with very low complexity. Implementation of GRAND decoding in a zipper framework with minimal soft information exchange among component codes to enable use of GRAND decoding in optical network application is described.

In a first broad aspect of the present technology, there is provided a method of executing Forward Error Correction (FEC) decoding, the method being executable by a processor. The method includes acquiring a stream of real data symbols from a communication medium, the stream of real data symbols being arranged in a real matrix such that a given real data symbol is associated with a respective real row position and a respective real column position in the real matrix. The method further includes generating virtual data symbols being arranged in a virtual matrix such that a given virtual data symbol is associated with a respective virtual row position and a respective virtual column position in the virtual matrix, the generating including applying an interleaver map onto the real matrix. The method further includes forming a main matrix by horizontally concatenating the real matrix and the virtual matrix and iteratively decoding codewords formed by the main matrix, each codeword being represented by a given row of virtual data symbols in the virtual matrix and a corresponding row of real data symbols in the real matrix. An iteration of the decoding includes identifying a set of M consecutive received rows of the main matrix, accessing a set of pre-determined reference codewords and in response to determining that a given codeword of the set of M consecutive received rows does not match any pre-determined reference codewords, executing a Guessing Random Additive Noise Decoding (GRAND) algorithm on the given codeword, the GRAND algorithm generating a substitute codeword for the given codeword.

In some implementations of the method, the real matrix and the virtual matrix respectively represent a real buffer and a virtual buffer of a zipper coding scheme.

In some implementations of the method, the GRAND algorithm is a Quantize GRAND (QGRAND) algorithm.

In some implementations of the method, the GRAND algorithm is an Ordered Reliability Bits GRAND (ORB GRAND) algorithm.

In some implementations of the method, the communication medium is an optical communication medium.

In some implementations of the method, the real data symbols form a component code coded using a coding protocol, the coding protocol being selected among a group of coding protocol including cyclic redundancy check (CRC) protocol, Bose-Chaudhuri-Hocquenghem (BCH) protocol, Polar coding protocol, Low-density parity-check (LDPC) protocol and Reed-Solomon (RS) protocol.

In some implementations of the method, executing the GRAND algorithm on the given codeword includes accessing a set of pre-defined Test Error Patterns (TEPs), applying each of the pre-defined TEPs to bits of the given codeword, each TEP applied to the given codeword causing generation of a codeword variation of the given codeword and in response to a given codeword variation being identified as matching a pre-determined reference codeword, defining the substitute codeword based on the given codeword variation.

In some implementations of the method, each TEP is associated with a corresponding priority level, and generating the substitute codeword for the given codeword further includes, in response to a plurality of codeword variations caused by application of a corresponding plurality of TEPs being identified as matching a plurality of corresponding pre-determined reference codewords, defining the substitute codeword based on a codeword variation that has been generated by application of a TEP having a highest priority level among the plurality of TEPs.

In some implementations of the method, the method further includes replacing the given codeword by the substitute codeword in the main matrix.

In some implementations of the method, the method further includes updating the main matrix through the interleaver map based on the substitute codeword.

In a second broad aspect of the present technology, there is provided a system for executing Forward Error Correction (FEC) decoding. The system includes a processor, and a memory configured to store instructions which, upon being executed by the processor, cause the processor to acquire a stream of real data symbols from a communication medium, the stream of real data symbols being arranged in a real matrix such that a given real data symbol is associated with a respective real row position and a respective real column position in the real matrix, generate virtual data symbols being arranged in a virtual matrix such that a given virtual data symbol is associated with a respective virtual row position and a respective virtual column position in the virtual matrix, the generating including applying an interleaver map onto the real matrix, form a main matrix by horizontally concatenating the real matrix and the virtual matrix and iteratively decode codewords formed by the main matrix, each codeword being represented by a given row of virtual data symbols in the virtual matrix and a corresponding row of real data symbols in the real matrix. An iteration of the decoding includes identifying a set of M consecutive received rows of a main matrix, accessing a set of pre-determined reference codewords, and in response to determining that a given codewords of the set of M consecutive received rows does not match any pre-determined reference codewords, executing a Guessing Random Additive Noise Decoding (GRAND) algorithm on the given codeword, the GRAND algorithm generating a substitute codeword for the given codeword.

In some implementations of the system, the real matrix and the virtual matrix respectively represent a real buffer and a virtual buffer of a zipper coding scheme.

In some implementations of the system, the GRAND algorithm is a Quantize GRAND (QGRAND) algorithm.

In some implementations of the system, the GRAND algorithm is an Ordered Reliability Bits GRAND (ORB GRAND) algorithm.

In some implementations of the system, the communication medium is an optical communication medium.

In some implementations of the system, the real data symbols form a component code coded using a coding protocol, the coding protocol being selected among a group of coding protocol including cyclic redundancy check (CRC) protocol, Bose-Chaudhuri-Hocquenghem (BCH) protocol, Polar coding protocol, Low-density parity-check (LDPC) protocol and Reed-Solomon (RS) protocol.

In some implementations of the system, the processor is further configured to execute the GRAND algorithm on the given codeword by accessing a set of pre-defined Test Error Patterns (TEPs), applying each of the pre-defined TEPs to bits of the given codeword, each TEPs applied to the given codeword corresponding to a codeword variation of the given codeword and in response to a given codeword variation being identified as matching a pre-determined reference codewords, defining the substitute codeword as the given codeword variation.

In some implementations of the system, each TEP is associated with a corresponding priority level, and the processor is further configured to generate the substitute codeword for the given codeword by, in response to a plurality of codeword variations caused by application of a corresponding plurality of TEPs being identified as matching a plurality of corresponding pre-determined reference codewords, defining the substitute codeword based on a codeword variation that has been generated by application of a TEP having a highest priority level among the plurality of TEPs.

In some implementations of the system, the processor is further configured to replace the given codeword by the corresponding substitute codeword in the real matrix.

In some implementations of the system, the processor is further configured to update the main matrix through the interleaver map based on the substitute codeword.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Embodiments of the present disclosure will be described by way of example only with reference to the accompanying drawings, in which:

FIG. 6 is a flow diagram showing operations of a method for executing Forward Error Correction (FEC) decoding by the system of FIG. 2 in accordance with an embodiment of the present technology.

DETAILED DESCRIPTION

Figure 1:
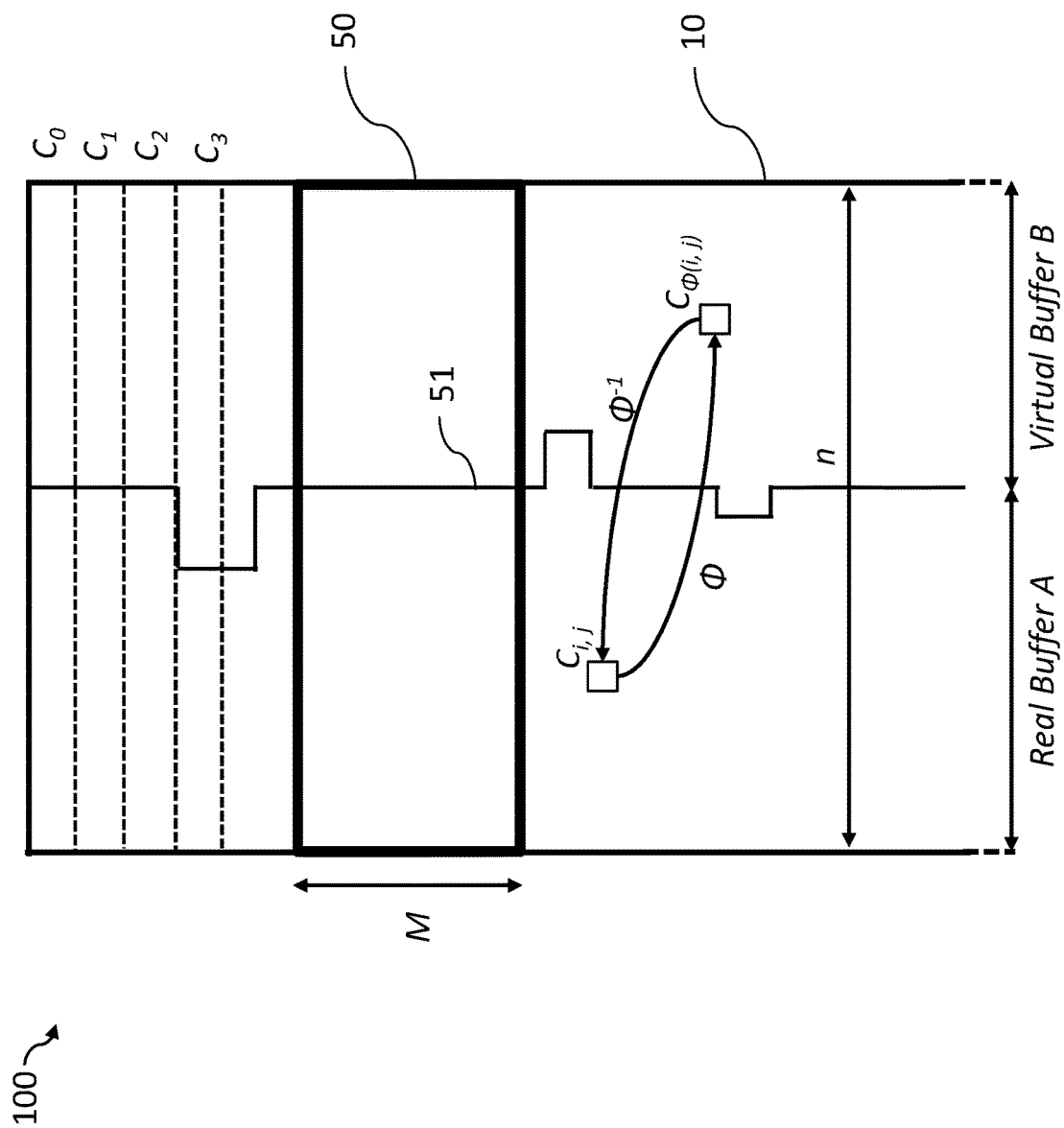
FIG. 1 is a graphical representation of a zipper code framework in accordance with some non-limiting embodiments of the present technology.

With reference to FIG. 1, there is depicted a graphical representation 100 of a typical zipper code framework. Broadly speaking, a zipper code framework includes three main components: a component code, a zipping pair, and an interleaver map.

For example, the component code can be a Bose-Chaudhuri-Hocquenghem (BCH) code C, of length n, dimension k, and correction capability t. In this example, the zipper buffer is an infinite sequence of BCH codewords $C_0$, $C_1$, $C_2$ . . . that form a matrix with n columns and a number rows horizontally defined. A given row of said matrix thus including n bits.

In this example, the buffer is divided into two buffers: a real buffer A, and a virtual buffer B. Buffers A and B are called a zipping pair (A, B). It should be noted that only the data symbols (e.g. bits $C_{i,j}$) of the real buffer A are transmitted over the communication channel. It should also be noted that virtual data symbols of the virtual buffer B can be determined and used during the decoding process. In the context of the present disclosure, data symbols in the real buffer A form what is referred to as a real matrix, and data symbols in the virtual buffer B form what is referred to as a virtual matrix. Horizontal concatenation of the real and virtual matrices forms a main matrix 10. In this context, the expression "horizontal concatenation" may for example be understood as adjoining the real and virtual matrices so that each pair comprising a respective horizontally defined row of the real matrix and of the virtual matrix is combined to form a horizontal row of the main matrix 10. The main matrix 10 may also be referred to as a component code.

The virtual bits of the virtual buffer B are a copy of the data symbols of the real buffer A through the interleaver map, denoted by Φ. For practical purposes, the interleaver map can be considered to be bijective, periodic and causal. It can be said that each virtual symbol of a valid zipper codeword is a copy of a real symbol as prescribed by the interleaver map Φ, and each row of a valid zipper codeword is a codeword of the corresponding constituent code.

It should be noted that even though the real and virtual buffers A and B may be referred to as real and virtual matrices respectively, a number of data symbols for each row of said matrices taken separately may not be constant. Line 51 in FIG. 1 is a delimitation between the real and virtual matrices. As shown, said delimitation may vary from one row to another. For example, let $m_i=|A_i|$ denote the length of the i-th row of the virtual buffer B. The length of the corresponding real row therefore is $n-m_i$. Generally, $m_i$'s for different rows can be different but the interleaver map is defined such that have $m_{i+\partial}=m_i$, where $\partial>0$ is the interleaver map period. In this implementation, the value of $m_i$ is fixed at $m_i=n/2$. The main matrix 10 thus have a constant number n of columns.

A zipper code can be decoded using a sliding-window decoding algorithm. There is shown a current decoding window 50 of a given iterative decoding iteration. Broadly speaking, in a non-limiting implementation, the decoding sliding-window algorithm iteratively decodes M consecutive received rows using a Guessing Random Additive Noise Decoding (GRAND) algorithm. It should be noted that a new iteration of the decoding may be executed when new rows of the main matrix 10 are acquired. It should be noted that decoding each row is based on previous rows of the main matrix 10. At the arrival of a new group of rows in the main matrix 10, also referred to as a "chunk", the decoder outputs the oldest chunk within the decoding window. In order to determine the decoder memory size for the window decoder, a new parameter referred to herein as "maximum lookback" parameter λ is configured in the zipper code framework. The parameter λ defines the maximum number of older rows that should be accessed to decode the current decoding window 50. The value of parameter λ depends on the structure of Φ function (i.e., the interleaver map).

Figure 2:
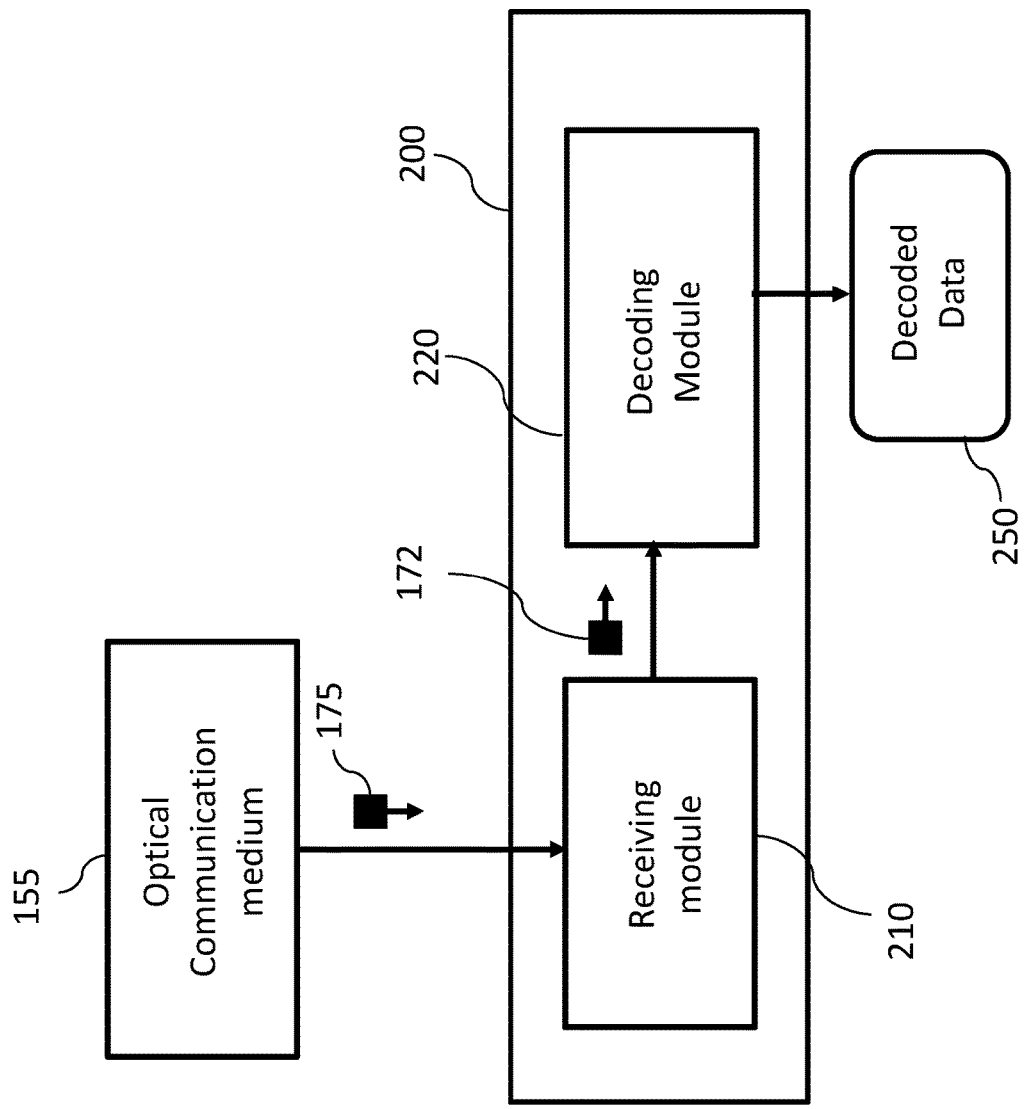
FIG. 2 is a block-diagram of a system configured to execute a Forward Error Correction (FEC) decoding scheme in accordance with some non-limiting embodiments of the present technology.

FIG. 2 is a block diagram illustrating a system 200 configured to execute a Forward Error Correction (FEC) decoding scheme. The system 200 is communicably connected to a communication medium 155 for receiving data therefrom, and includes a receiving module 210 and a decoding module 220. However, it should be understood that in some embodiments of the present technology, the system 200 may be implemented with additional, fewer, and/or different components to those illustrated in FIG. 2. For example, the system 200 may be embodied as an optical communication system (e.g., optical transceiver) enabling communication of moderate-rate large-length codes over the communication medium 155 or another optical communication medium. In a non-limiting implementation, the communication medium 155 is an optical communication medium such as an optical fiber. It is contemplated that the receiving module 210 may support optical termination and conversion of signals between electrical and optical domains, to provide for reception of FEC encoded data over the optical communication medium 155.

A structure and operation of each of these modules may depend on inter alia physical media and signaling mechanisms or protocols of components of the system 200 by which they are executed. In general, each component includes at least some sort of physical connection to a transfer medium, possibly in combination with other hardware and/or software-based elements, which will depend on inter alia a specific transfer media and/or specific mechanisms and/or specific implementations of the present technology.

Figure 3:
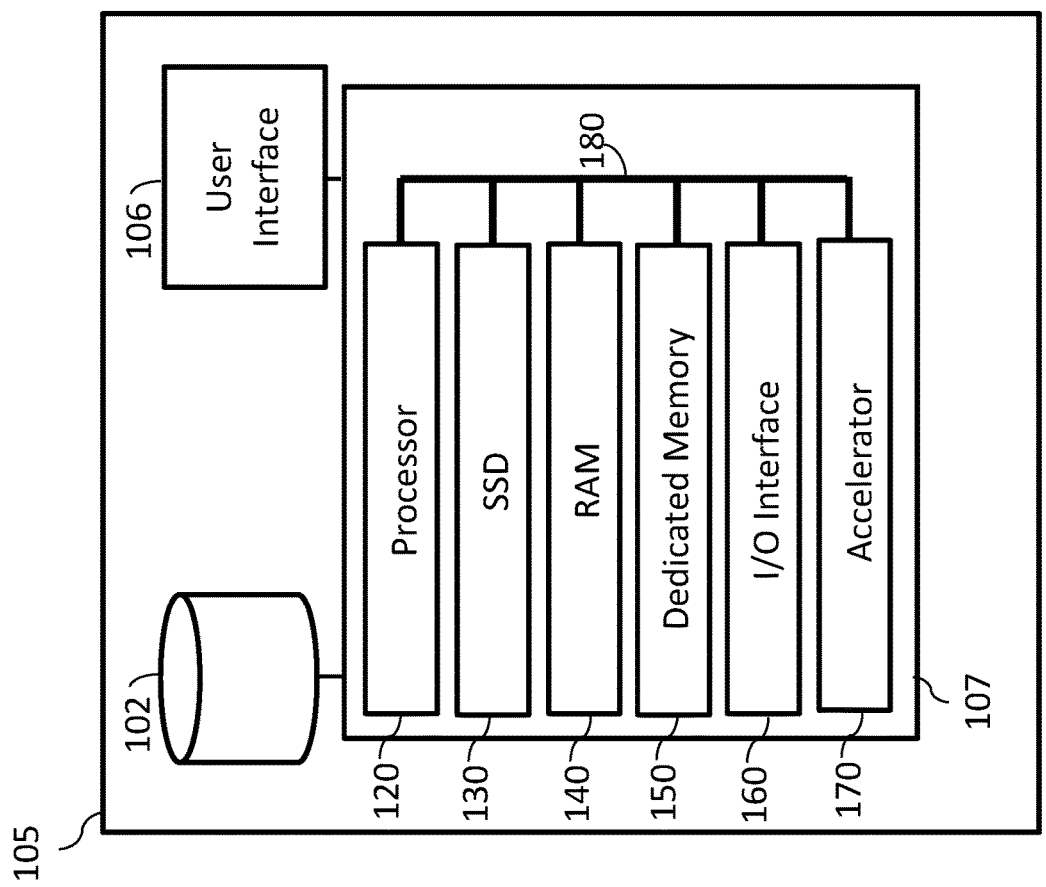
FIG. 3 is a block diagram of an electronic device in accordance with some non-limiting embodiments of the present technology.

With reference to FIG. 3, there is shown an electronic device 105 in accordance with non-limiting implementations of the present technology. In an embodiment, the system 200 is implemented as the electronic device 105, the electronic device 105 being suitable for executing all functions of the system 200, including the functions of the receiving module 210 and of the decoding module 220.

The electronic device 105 comprises a computing unit 107. In some implementations, the computing unit 107 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 107 comprises various hardware components including one or more single or multi-core processors collectively represented by a processor 120, a solid-state drive 130, a RAM 140, a dedicated memory 150 and an input/output interface 160. The computing unit 107 may be a generic computer system.

In some other embodiments, the computing unit 107 may be an "off the shelf" generic computer system. In some embodiments, the computing unit 107 may also be distributed amongst multiple systems. The computing unit 107 may also be specifically dedicated to the implementation of the present technology. As a person in the art of the present technology may appreciate, multiple variations as to how the computing unit 107 is implemented may be envisioned without departing from the scope of the present technology.

Communication between the various components of the computing unit 107 may be enabled by one or more internal and/or external buses 180 (e.g. a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 130 stores program instructions suitable for being loaded into the RAM 140 and executed by the processor 120. Although illustrated as a solid-state drive 130, any type of memory may be used in place of the solid-state drive 130, such as a hard disk, optical disk, and/or removable storage media.

The processor 120 may be a general-purpose processor, such as a central processing unit (CPU) or a processor dedicated to a specific purpose, such as a digital signal processor (DSP). In some embodiments, the processor 120 may also rely on an accelerator 170 dedicated to certain given tasks. In some embodiments, the processor 120 or the accelerator 170 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the electronic device 105 may include a Human-Machine Interface (HMI) 106. The HMI 106 may include a screen or a display capable of rendering an interface and indications of coded and/or decoded data, and/or any other information suitable for performing the methods described herein. In this embodiment, the display of the HMI 106 includes and/or be housed with a touchscreen to permit users to input data via some combination of virtual keyboards, icons, menus, or other Graphical User Interfaces (GUIs). The HMI 106 may thus be referred to as a user interface 106.

In some embodiments, the display of the user interface 106 may be implemented using a Liquid Crystal Display (LCD) display or a Light Emitting Diode (LED) display, such as an Organic LED (OLED) display. The device may be, for example and without being limitative, a handheld computer, a personal digital assistant, a cellular phone, a network device, a smartphone, a navigation device, an e-mail device, a game console, or a combination of two or more of these data processing devices or other data processing devices. The user interface 106 may be embedded in the electronic device 105 as in the illustrated embodiment of FIG. 3 or located in an external physical location accessible to the user. For example, the user may communicate with the computing unit 107 (i.e. send instructions thereto and receive information therefrom) by using the user interface 106 wirelessly connected to the computing unit 107. The computing unit 107 may communicate with the user interface 106 via a network (not shown) such as a Local Area Network (LAN) and/or a wireless connexion such as a Wireless Local Area Network (WLAN).

The electronic device 105 may comprise a memory 102 communicably connected to the computing unit 107 for storing received coded data and/or generated decoded data. The memory 102 may be embedded in the electronic device 105 as in the illustrated embodiment of FIG. 2 or located in an external physical location. The computing unit 107 may be configured to access a content of the memory 102 via a network (not shown) such as a Local Area Network (LAN) and/or a wireless connexion such as a Wireless Local Area Network (WLAN).

Needless to say, the computing unit 107 may be implemented in any other suitable hardware, software, and/or firmware, or a combination thereof. In the depicted non-limiting embodiments of the present technology in FIG. 3, the computing unit 107 is a single component. In alternative non-limiting embodiments of the present technology, the functionality of the computing unit 107 may be distributed and may be implemented via multiple components.

Those skilled in the art will appreciate that processor 120 is generally representative of a processing capability that may be provided by, for example, a Central Processing Unit (CPU). In some embodiments, in place of or in addition to one or more conventional CPUs, one or more specialized processing cores may be provided. For example, one or more Graphic Processing Units (GPUs), Tensor Processing Units (TPUs), accelerated processors (or processing accelerators) and/or any other processing unit suitable for executing decoding protocols may be provided in addition to or in place of one or more CPUs. In alternative embodiments, the dedicated memory 140 may be a Random Access Memory (RAM), a Video Random Access Memory (VRAM), a Window Random Access Memory (WRAM), a Multibank Dynamic Random Access Memory (MDRAM), a Double Data Rate (DDR) memory, a Graphics Double Data Rate (GDDR) memory, a High Bandwidth Memory (HBM), a Fast-Cycle Random-Access Memory (FCRAM) or any other suitable type of computer memory.

Broadly speaking, the system 200 is configured to execute a FEC decoding scheme for decoding data received from the communication medium 155 and generate decoded data 250. In alternative implementations, functions of the system 200 may be used for controlling errors in data transmission.

Referring back to FIG. 2, the system 200 receives a component code 175 or a chunk of the component code 175 from the communication medium 155 at the receiving module 210, the component code 175 or chunks thereof being coded data having been coded through a FEC coding scheme. In some implementation, the system 200 may receive redundant data along with the component code 175.

The receiving module 210 may execute pre-processing algorithm to the received component code 175 such as optical noise filtering, optical to electrical signal conversion, denoising algorithm or any other suitable algorithm. The receiving module 210 thus generates a stream 172 of real data symbols from the component code 175 and further transmits the stream 172 to the decoding module 220.

The decoding module 220 may be implemented in any of various ways, using hardware, firmware, one or more processors executing software stored in computer-readable storage, or some combination thereof. Some examples of devices that may be suitable for implementing the decoding module 220 include, but are not limited to, Application Specific Integrated Circuits (ASICs), Programmable Logic Devices (PLDs), Field Programmable Gate Arrays (FPGAs), and microprocessors for executing software stored on a non-transitory computer-readable medium such as a magnetic or optical disk or a solid-state memory device. Broadly speaking, the decoding module 220 operate in accordance with one or more specific zipper code schemes devised by the developers of the present technology to decode the stream 172 and generate decoded data 250.

As it will be described in greater detail herein further below, developers of the present technology have devised non-limiting implementations of execution of FEC decoding that enable use of GRAND algorithm for optical communication applications. However, it should be noted that operation of the system 200 and the decoding module 220 may be adjusted depending on expected or actual operating conditions.

In use, the decoding module 220 receives the real data symbols and forms a real matrix (e.g. the real matrix on FIG. 1). The decoding module 220 further generates virtual data symbols using the interleaver map $\Phi$ by copying the real data symbols in a virtual matrix through the interleaver map $\Phi$. The decoding module 220 thus forms a virtual matrix and a main matrix by concatenating the real and virtual matrices. For clarity purposes, the main matrix formed by the decoding module 220 is considered to be the main matrix 10. The decoding module 220 further performs an iterative decoding of the main matrix 10 by employing the decoding window 50.

For a given bit (i, j) of the main matrix 10 (i.e. each codeword), the decoding module 220 generates a first value $L_i^j$ indicative of a channel log-likelihood ratio (LLR) and a second value $E_i^j$ indicative of an extrinsic LLR. The first value may be used Channel LLRs may be used as inputs of any soft-decoding FEC. Extrinsic LLRS are initialized by null vector and are updated during the iterative decoding as described in greater herein after.

Broadly speaking, the decoding module 220 identifies, in use, a set of M consecutive received rows of the main matrix 10 as the current decoding window 50, the set of M consecutive received rows containing consecutive received codewords. The decoding module 220 further accesses a set of pre-determined reference codewords, and, in response to determining that a given codeword of the set of M consecutive received rows does not match any pre-determined reference codewords, executes a Guessing Random Additive Noise Decoding (GRAND) algorithm on the given codeword. A pseudo-code of the decoding of the current decoding window 50 is presented in the following pseudo-algorithm.

Inputs: a codeword D to be decoded and corresponding to the j-th row of the main matrix 10; the set of reference codewords; $\{L_i^j\}_{i=\{1;n\}}$ and $\{E_i^j\}_{i=\{1;n\}}$ Code: if synd(D)!=0:
for i in {1 ... N}:
$In_i^j = L_i^j + E_i^j$
$Out^j, E^j$=QGRAND_decoder($In^j$)
D=HD($Out^j$)

where synd is a function that returns 0 when an argument thereof matches any one of the reference codewords, and HD is any known hard decision decoding function. For example, the function HD returns an output vector with, for a given bit of its input, 1 if said bit is strictly above 0, and 0 if said bit is below or equal to 0. $E^j$ is a vector formed by the second values of bits of the codeword D, $E^j = \{E_1^j, E_2^j, \ldots, E_n^j\}$. $In^j$ is a vector formed by the sims of the first and second values of bits of the codeword D, $In^j = \{In_1^j, In_2^j, \ldots, In_n^j\} = +\{L_1^j + E_1^j, L_2^j + E_2^j, \ldots, L_n^j + E_n^j\}$.

The QGRAND_decoder function may be implemented using the following pseudo code.

Inputs: the input vector $In^j$ previously determined and a set of T pre-defined test error patterns (TEPs).

```
Code:
for k in {1 ... T}:
    for i in {1 ... n}:
        if i in TEP_k:
            D_i^k = flip(HD(In_i^j))
        D_i^k = (HD(In_i^j)) else:
                                D_i^k = (HD(In_i^j))
    if synd(D_k) = 0:
        Out^j = D_k
        for i in {1 ... n}:
            if i in TEP_k:
                E_j = β_1 · D_i^k
            else:
                E_j = β_2 · D_i^k
        BREAK
If no candidate is found, E_j = 0.
``` where flip(x) is a function that inverts the bits of its argument, $\beta_1$ and $\beta_2$ being two pre-defined constant values. The condition if i in $TEP_k$ is True for bits at position i that are equal to 1 and False otherwise. For example, for $TEP_k$=100010, the condition if i in $TEP_k$ is True for i=1 and i=5.

As an example, a given value of the input vector $In^j$ may be $In^j = \{-3, -5, 2, -1, 3, 2\}$. Therefore, HD($In^j$)=001011. A given TEP may be a function returning an output of the operation "xor 100010". As such, TEP(HD($In^j$))=101001 (by flipping the first index from 0 to 1, flipping the 5th index from 1 to 0).

Broadly speaking, each of the TEPs is applied to bits generated from the given codeword to be decoded, each TEP applied to the given codeword causing generation of a codeword variation of the given codeword. In one example, the codeword variation is 101001. In response to a given codeword variation being identified as matching a pre-determined reference codeword, the decoding module 220 defines the substitute codeword $D_k$ based on the given codeword variation.

As a result, for each codeword that does not match any of the reference codewords, the decoding algorithm 220 generates a substitute codeword for the given codeword. The substitute codeword further replaces the corresponding codeword in the main matrix 10.

Although in this example, a Quantize GRAND (QGRAND) algorithm is used at each iteration of the decoding of the decoding window 50, use of other GRAND algorithms (e.g. Ordered Reliability Bits GRAND) are contemplated in alternative embodiments.

In a non-limiting implementation, in response to a given bit being generated in a substitute codeword in the main matrix 10, the associated bit through the interleaver map P is modified accordingly.

In a non-limiting implementation, each TEP is associated with a corresponding priority level, and in response to a plurality of codeword variations caused by application of a corresponding plurality of TEPs being identified as matching a plurality of corresponding pre-determined reference codewords, the decoding module 220 defines the substitute codeword based on a codeword variation that has been generated by application of a TEP having a highest priority level among the plurality of TEPs.

Figure 4:
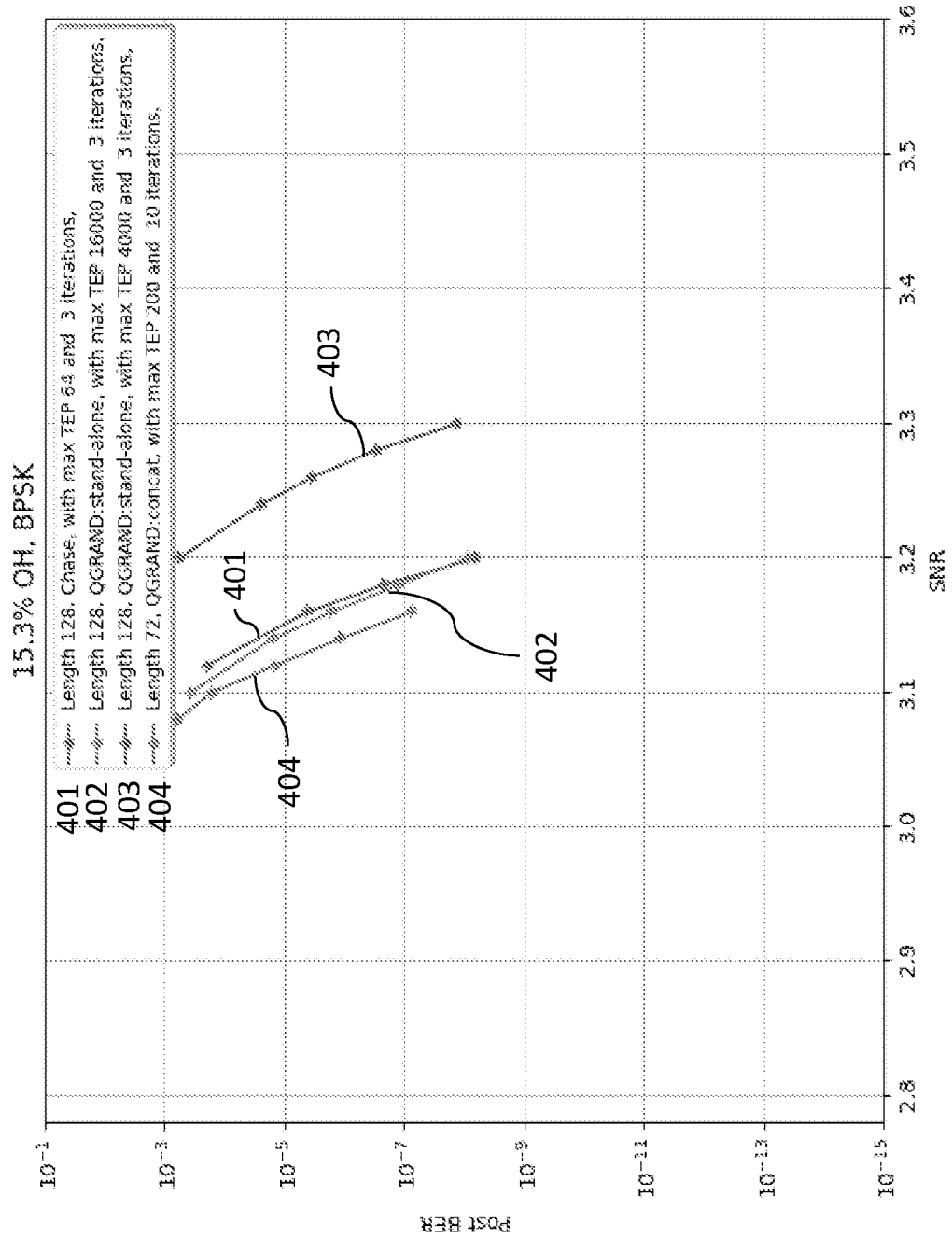
FIG. 4 is a chart showing simulation measurements comparing performances of the present technology with other decoding algorithms.

FIG. 4 is a chart showing simulation measurements comparing performances of the present technology with other decoding algorithms. More specifically, a post Bit-Error Rate (BER) and a Signal-to-Noise Ratio (SNR) have been measured for different lengths of codewords, different number of TEPs, and different numbers of iteration in the decoding (i.e. a different size of the decoding window 50). Line 401 represent experimental results for known open FEC (oFEC) decoding algorithm using Chase protocol. Lines 402, 403 and 404 are representative of performances of different implementations of the present technology.

More specifically, FIG. 4 illustrates results of a Monte-Carlo simulation to compare performances of different approaches. For different arbitrary values of SNR, transmitted codeword bits are compared with the output of the decoding module 220, referred to as Post-FEC BER. Different combination of operational variables such as FEC over-head (OH), length of the codewords, and component code (BCH) are tested. Lines 402 and 403 represent experimental results for respective stand-alone (one FEC decoder provide post-FEC BER of 10-15) FEC decoding algorithms, with different values of a maximal number of TEPs and both using a QGRAND zipper protocol. The component code for lines 402, 403 is BCH. Lines 404 represents experimental results for a concatenated (one soft-decoding FEC (inner) concatenated with a hard-decoding (outer) FEC) FEC decoding algorithm using a QGRAND zipper protocol. The component code for line 404 is CRC.

Figure 5:
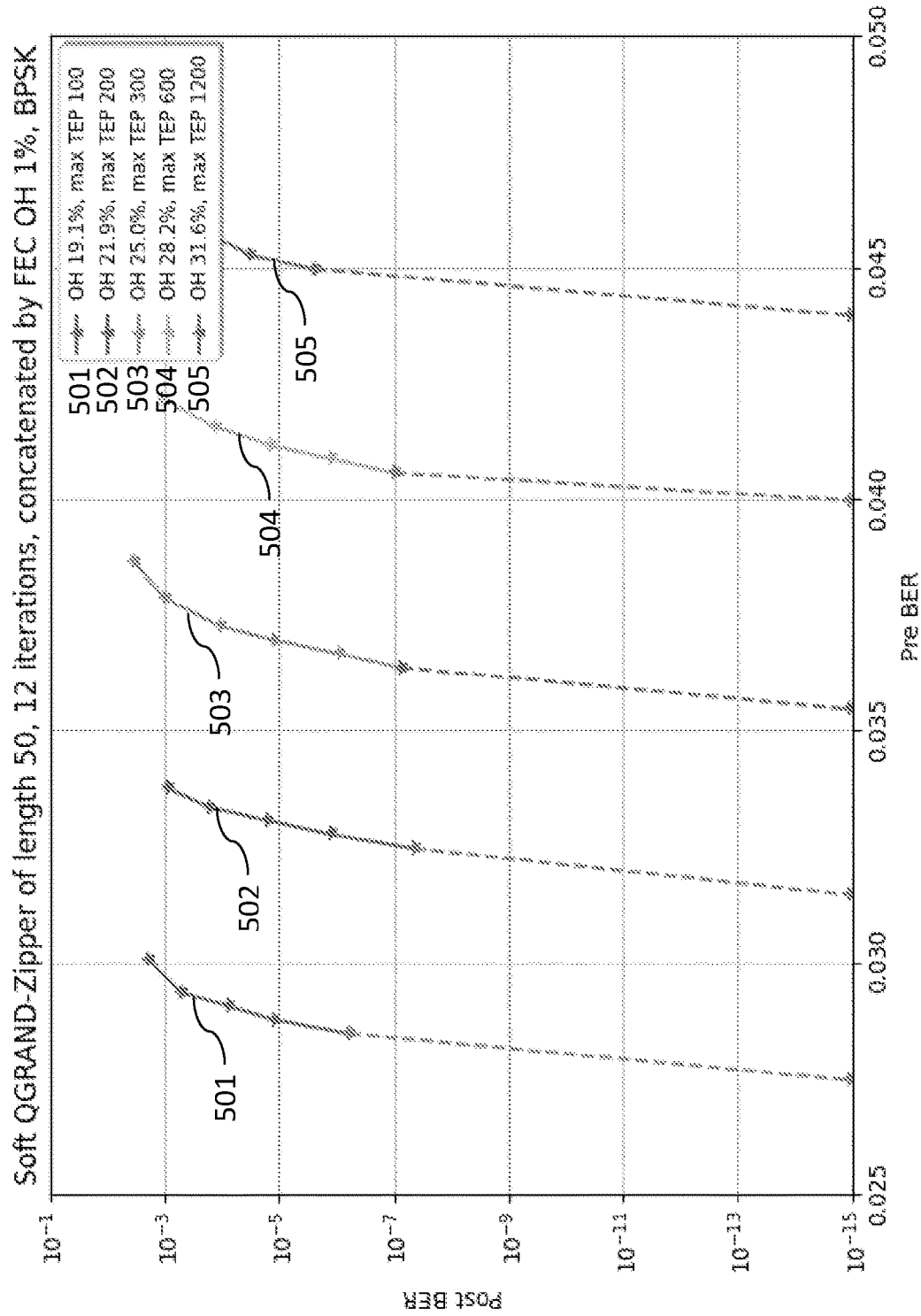
FIG. 5 is a chart showing simulation measurements of performances of the present technology with different overhead of received coded data.

FIG. 5 is a chart showing simulation measurements of performances of the present technology with different overhead of received coded data. The chart of FIG. 5 shows that the present technology provides a flexible-rate decoding algorithm. More specifically, a post BER has been measured according to pre-BER for different values of OH in the received component code 175, using different numbers of TEPs. As shown, the present technology may support a wide range of FEC over-heads, which makes it suitable for optical network applications.

More specifically, FIG. 5 illustrates results of a Monte-Carlo simulation to compare performances of the present technology for different values of FEC OH. For different arbitrary values of FEC OH, Post-FEC BER values and Pre-FEC BER values are determined, the Pre-FEC BER values being determined by comparing the transmitted codeword bits with the input of the decoding module 220. Line 501 represents experimental results for a FEC OH of 19.1% and a maximal number of TEPs of 100, line 502 represents experimental results for a FEC OH of 21.9% and a maximal number of TEPs of 200, line 503 represents experimental results for a FEC OH of 25.0% and a maximal number of TEPs of 300, line 504 represents experimental results for a FEC OH of 28.2% and a maximal number of TEPs of 600 and line 505 represents experimental results for a FEC OH of 31.6% and a maximal number of TEPs of 1200. The lines 501 to 505 have been obtained using a concatenated FEC decoding algorithm using a QGRAND zipper protocol. The component code used for these simulations is CRC. Dashed lines on FIG. 5 are extrapolations of the results to estimate the curve reaching Post FEC BER of $10^{-15}$.

With reference to FIG. 6, there is depicted a method 600 executable by a processor for executing Forward Error Correction (FEC) decoding. In some non-limiting embodiments of the present technology, it is contemplated that the method 600 may be executed by a component (e.g. the processor 120) of the electronic device 105 implementing the system 200, respectively illustrated in FIGS. 3 and 2. Various operations of the method 600 will now be described.

The method 600 begins with acquiring, at operation 610, a stream of real data symbols from a communication medium. In some embodiments of the present technology, the communication medium may be an optical communication medium implemented similarly to the optical communication medium 155. The stream of real data symbols may be part of component code 175 transmitted over the optical communication medium 155.

The real data symbols form a component code coded using a coding protocol. The coding protocol may be a cyclic redundancy check (CRC) protocol, a Bose-Chaudhuri-Hocquenghem (BCH) protocol, a Polar coding protocol, a Low-density parity-check (LDPC) protocol or a Reed-Solomon (RS) protocol.

In some implementation, the communication medium is an optical communication medium.

The stream of real data symbols is arranged in a real matrix such that a given real data symbol is associated with a respective real row position and a respective real column position in the real matrix. It should be noted that the real data symbols from the stream of real data symbols may be included in a real buffer of a given zipper code scheme executed by the system 200.

The method 600 continues with generating, at operation 620, virtual data symbols being arranged in a virtual matrix such that a given virtual data symbol is associated with a respective virtual row position and a respective virtual column position in the virtual matrix. It should be noted that the virtual data symbols generated by the processor may be included in a virtual buffer of the given zipper code scheme executed by the system 200. During generation of the virtual data symbols, the processor is configured to apply an interleaver map onto the real matrix.

In this implementation, the real matrix and the virtual matrix respectively represent a real buffer and a virtual buffer of a zipper coding scheme.

The method 600 continues with forming, at operation 630, a main matrix from the real and virtual matrices. In this implementation, the main matrix is formed, for example and without limitation, by horizontally concatenating the real matrix and the virtual matrix.

The method 600 continues with iteratively decoding, at operation 640, codewords formed by the main matrix, each codeword being represented by a given row of virtual data symbols in the virtual matrix and a corresponding row of real data symbols in the real matrix.

Operation 640 may comprise sub-operations 642, 644 and 646. Operation 640 therefore continues with identifying, at sub-operation 642, a set of M consecutive rows of the main matrix. The set of M consecutive rows may be referred as a decoding window.

Operation 640 continues with accessing, at sub-operation 644, a set of pre-determined reference codewords.

Operation 640 continues with executing, at sub-operation 646, in response to determining that a given codeword of the set of M consecutive received rows does not match any pre-determined reference codewords, a Guessing Random Additive Noise Decoding (GRAND) algorithm on the given codeword, the GRAND algorithm generating a substitute codeword for the given codeword.

In this implementation, the GRAND algorithm is a Quantize GRAND (QGRAND) algorithm. Other GRAND algorithms are contemplated in alternative implementations, such as Ordered Reliability Bits GRAND (ORB GRAND) algorithm.

In a non-limiting implementation, an execution of the GRAND algorithm includes accessing a set of pre-defined Test Error Patterns (TEPs), applying each of the pre-defined TEPs to bits of the given codeword, each TEP applied to the given codeword causing generation of a codeword variation of the given codeword and, in response to a given codeword variation being identified as matching a pre-determined reference codeword, defining the substitute codeword based on the given codeword variation.

In this implementation, each TEP is associated with a corresponding priority level. In response to a plurality of codeword variations caused by application of a corresponding plurality of TEPs being identified as matching a plurality of corresponding pre-determined reference codewords, the substitute codeword is defined based on a codeword variation that has been generated by application of a TEP having a highest priority level among the plurality of TEPs.

Operation 640 may continue with replacing, at sub-operation 648, the given codeword by the substitute codeword in the main matrix, and updating, at sub-operation 649, the main matrix through the interleaver map based on the substitute codeword.

While the above-described implementations have been described and shown with reference to particular operations performed in a particular order, it will be understood that these operations may be combined, sub-divided, or re-ordered without departing from the teachings of the present technology. At least some of the operations may be executed in parallel or in series. Accordingly, the order and grouping of the operations is not a limitation of the present technology.

Those of ordinary skill in the art will realize that the descriptions of various embodiments are illustrative only and are not intended to be in any way limiting. Other embodiments will readily suggest themselves to such persons with ordinary skill in the art having the benefit of the present disclosure. Furthermore, at least some of the disclosed embodiments may be customized to offer valuable solutions to existing needs and problems related to FEC solutions. In the interest of clarity, not all of the routine features of the implementations of the at least some of the disclosed embodiments are shown and described.

In particular, combinations of features are not limited to those presented in the foregoing description as combinations of elements listed in the appended claims form an integral part of the present disclosure. It will, of course, be appreciated that in the development of any such actual implementation of the at least some of the disclosed embodiments, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of digital error correction having the benefit of the present disclosure.

In accordance with the present disclosure, the components, process operations, and/or data structures described in herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims

The invention claimed is:

1. A method of executing Forward Error Correction (FEC) decoding, the method being executable by a processor, the method comprising:
   acquiring a stream of real data symbols from a non-transitory communication medium, the stream of real data symbols being arranged in a real matrix such that a given real data symbol is associated with a respective real row position and a respective real column position in the real matrix;
   generating virtual data symbols being arranged in a virtual matrix such that a given virtual data symbol is associated with a respective virtual row position and a respective virtual column position in the virtual matrix, the generating including applying an interleaver map onto the real matrix,
   forming a main matrix by horizontally concatenating the real matrix and the virtual matrix; and
   iteratively decoding codewords formed by the main matrix, each codeword being represented by a given row of virtual data symbols in the virtual matrix and a corresponding row of real data symbols in the real matrix, an iteration of the decoding comprising:
  identifying a set of M consecutive received rows of the main matrix, M being in positive integer greater than or equal to two;
  accessing a set of pre-determined reference codewords; and
  in response to determining that a given codeword of the set of M consecutive received rows does not match any pre-determined reference codewords, executing a decoding algorithm on the given codeword, the decoding algorithm generating a substitute codeword for the given codeword.

2. The method of claim 1, wherein the real matrix and the virtual matrix respectively represent a real buffer and a virtual buffer of a zipper coding scheme.

3. The method of claim 1, wherein the non-transitory communication medium is an optical communication medium.

4. The method of claim 1, wherein the real data symbols form a component code coded using a coding protocol, the coding protocol being selected among a group of coding protocol comprising: cyclic redundancy check (CRC) protocol, Bose-Chaudhuri-Hocquenghem (BCH) protocol, Polar coding protocol, Low-density parity-check (LDPC) protocol and Reed-Solomon (RS) protocol.

5. The method of claim 1, wherein executing the decoding algorithm on the given codeword comprises:
  accessing a set of pre-defined Test Error Patterns (TEPs);
  applying each of the pre-defined TEPs to bits of the given codeword, each TEP applied to the given codeword causing generation of a codeword variation of the given codeword; and
  in response to a given codeword variation being identified as matching a pre-determined reference codeword, defining the substitute codeword based on the given codeword variation.

6. The method of claim 5, wherein:
  each TEP is associated with a corresponding priority level; and
  generating the substitute codeword for the given codeword further comprises, in response to a plurality of codeword variations caused by application of a corresponding plurality of TEPs being identified as matching a plurality of corresponding pre-determined reference codewords, defining the substitute codeword based on a codeword variation that has been generated by application of a TEP having a highest priority level among the plurality of TEPs.

7. The method of claim 1, further comprising replacing the given codeword by the substitute codeword in the main matrix.

8. The method of claim 7, further comprising updating the main matrix through the interleaver map based on the substitute codeword.

9. A system for executing Forward Error Correction (FEC) decoding, the system comprising:
  a processor;
  a memory configured to store instructions which, upon being executed by the processor, cause the processor to:
    acquire a stream of real data symbols from a non-transitory communication medium, the stream of real data symbols being arranged in a real matrix such that a given real data symbol is associated with a respective real row position and a respective real column position in the real matrix;
    generate virtual data symbols being arranged in a virtual matrix such that a given virtual data symbol is associated with a respective virtual row position and a respective virtual column position in the virtual matrix, the generating including applying an interleaver map onto the real matrix;
    form a main matrix by horizontally concatenating the real matrix and the virtual matrix; and
    iteratively decode codewords formed by the main matrix, each codeword being represented by a given row of virtual data symbols in the virtual matrix and a corresponding row of real data symbols in the real matrix, an iteration of the decoding comprising:
      identifying a set of M consecutive received rows of a main matrix, M being in positive integer greater than or equal to two;
      accessing a set of pre-determined reference codewords;
      in response to determining that a given codewords of the set of M consecutive received rows does not match any pre-determined reference codewords, executing a decoding algorithm on the given codeword, the GRAND decoding algorithm generating a substitute codeword for the given codeword.

10. The system of claim 9, wherein the real matrix and the virtual matrix respectively represent a real buffer and a virtual buffer of a zipper coding scheme.

11. The system of claim 9, wherein the non-transitory communication medium is an optical communication medium.

12. The system of claim 9, wherein the real data symbols form a component code coded using a coding protocol, the coding protocol being selected among a group of coding protocol comprising: cyclic redundancy check (CRC) protocol, Bose-Chaudhuri-Hocquenghem (BCH) protocol, Polar coding protocol, Low-density parity-check (LDPC) protocol and Reed-Solomon (RS) protocol.

13. The system of claim 9, wherein the processor is further configured to execute the decoding algorithm on the given codeword by:
  accessing a set of pre-defined Test Error Patterns (TEPs);
  applying each of the pre-defined TEPs to bits of the given codeword, each TEPs applied to the given codeword corresponding to a codeword variation of the given codeword; and
  in response to a given codeword variation being identified as matching a pre-determined reference codewords, defining the substitute codeword as the given codeword variation.

14. The system of claim 13, wherein:
  each TEP is associated with a corresponding priority level; and
  the processor is further configured to generate the substitute codeword for the given codeword by, in response to a plurality of codeword variations caused by application of a corresponding plurality of TEPs being identified as matching a plurality of corresponding pre-determined reference codewords, defining the substitute codeword based on a codeword variation that has been generated by application of a TEP having a highest priority level among the plurality of TEPs.

15. The system of claim 9, wherein the processor is further configured to replace the given codeword by the corresponding substitute codeword in the real matrix.

16. The system of claim 15, wherein the processor is further configured to update the main matrix through the interleaver map based on the substitute codeword.

\* \* \* \* \*